United States Patent [19]

Fressineau et al.

[11] 4,041,290

[45] Aug. 9, 1977

[54] MICROPROGRAM CONTROLLED BINARY DECIMAL CODED BYTE OPERATOR DEVICE

[75] Inventors: Jean-Louis Fressineau, Les Clayes-Sous-Bois; Maurice Hubert, Versailles, both of France

[73] Assignee: Compagnie Internationale pour l'Informatique, Louveciennes, France

[21] Appl. No.: 539,034

[22] Filed: Jan. 6, 1975

[30] Foreign Application Priority Data

Jan. 7, 1974 France .............................. 74.00463

[51] Int. Cl.² ............................................. G06F 7/38
[52] U.S. Cl. .................... 235/156; 235/169; 364/200
[58] Field of Search ............... 235/169, 170, 156, 159, 235/174, 176; 340/172.5

[56] References Cited

U.S. PATENT DOCUMENTS

| | | | |
|---|---|---|---|
| 3,571,582 | 3/1971 | Kelling | 235/170 |
| 3,621,219 | 11/1971 | Washizuka et al. | 235/170 |
| 3,707,622 | 12/1972 | Hatano et al. | 235/176 |
| 3,775,601 | 11/1973 | Hatano et al. | 235/156 |
| 3,859,514 | 1/1975 | Kashio | 235/156 |
| 3,899,667 | 8/1975 | Simons | 235/156 |

*Primary Examiner*—David H. Malzahn
*Attorney, Agent, or Firm*—Kemon & Estabrook

[57] ABSTRACT

A microprogram controlled operator device is described which processes bytes each of which is comprised of an equal number of binary-coded decimal figures. The device comprises first and second byte stores each of a multi-byte capacity, a logical and arithmetical operator circuit having inputs connected to read-out outputs of said stores and having an output to a buffer register and code handling organization, preferably further enabling "raw" byte inputting. An output of the code handling organization is connected to an input of a byte code processing arrangement which includes a multiplexer circuit having outputs to write-in inputs of the first and second stores and having further inputs connected to external data supplying means and to read-out outputs from the said stores. The organization further has an output to the external equipment wherein said device is connected.

10 Claims, 3 Drawing Figures

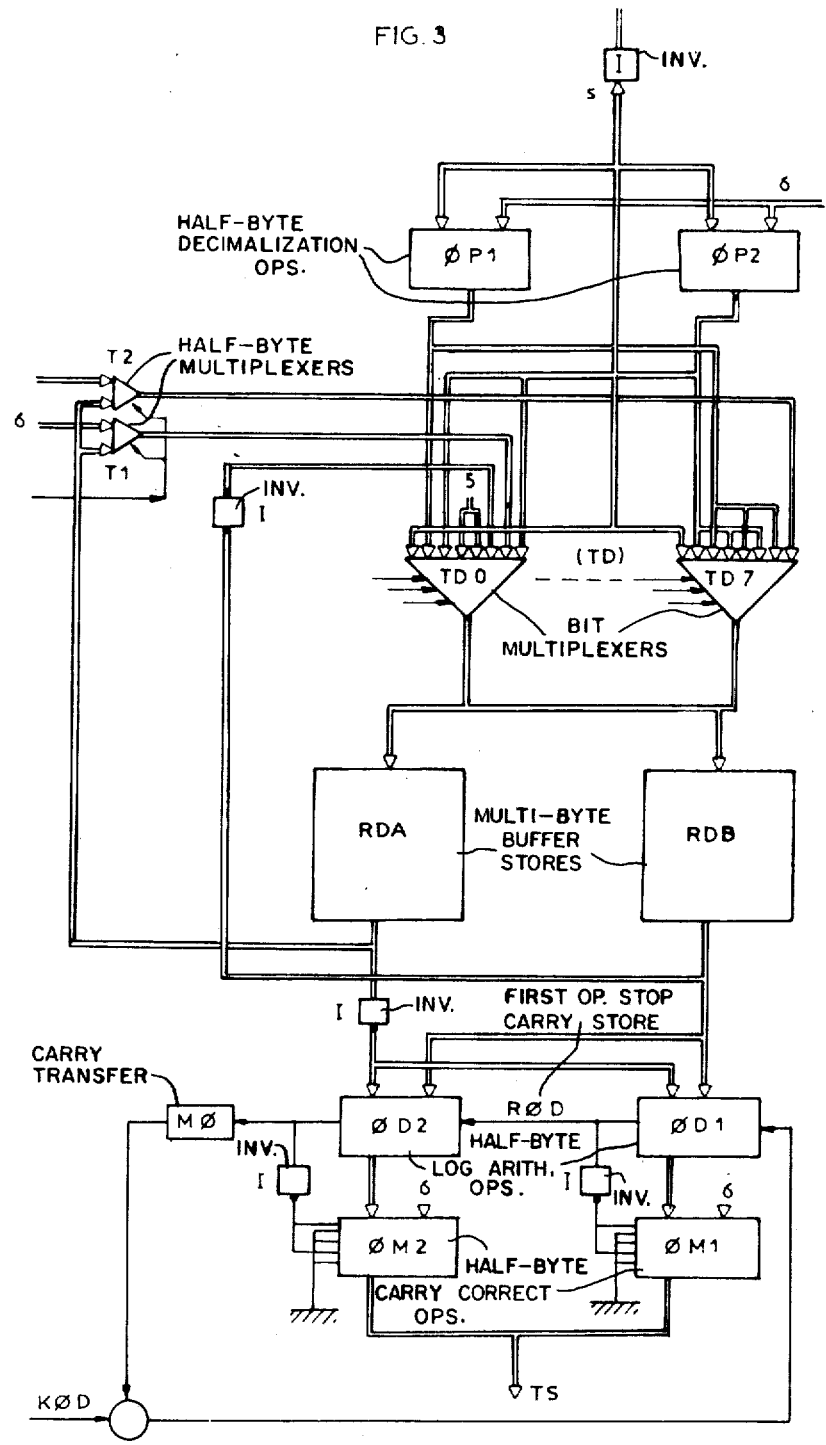

MICROPROGRAM CONTROLLED BINARY DECIMAL CODED BYTE OPERATOR DEVICE

BRIEF SUMMARY OF THE INVENTION

The present invention concerns improvement in or relating to byte operator devices for processing bytes each made of a definite number of binary-coded decimal figures. The bytes are members of a string of coded elements each having a number of bits which is a multiple of four and consequently representing such number of binary-coded figures or being capable of representing binary-coded figures after an appropriate code conversion. Illustratively though commonly, such bytes are octets and each byte consequently represents two four-bit binary-coded decimal figures.

The coded members of such strings appear in sequence in a transfer register for being sequentially processed in such byte operator device under the control of a processor microprogram the successive command words of which define the actual processing of the bytes.

Usually, the members of such strings are buffered within stores external to the byte operator device and the microprogram has to selectively call them between each operating step of the operator. This imposes a repetitive recourse to acquit and interrupt the steps of the operator and the operation of the device, which of course is damaging to the overall speed of the environmental equipment of the device in the data processor system of which it is a part.

The object of the invention is to provide a byte operator device having a structure that this drawback is eliminated or is, at least, reduced in that the operator device proper includes means for enabling data block transfers and simultaneous processing of the bytes in the blocks for appropriating them to the operator's nature and operative step program.

According to a feature of the invention, a byte operator device includes an arithmetical and logical unit having first and second data inputs and an output to an edit and transfer register means, first and second multibyte stores having read-out outputs to the said first and second inputs of the arithmetical and logical operator and having writein inputs from the said edit and transfer register means and from byte inputting means, and microinstruction controlled multiplexing means interposed between the outputs of the said edit and transfer register means and of the said byte inputting means and the write-in inputs of the stores for prior processing of the bytes to be stored as the block transfer and arithmetical and logical operations therewith are carried along according to the microinstruction sequences.

In a preferred embodiment, the byte inputting means are made joint to the said edit and transfer register means by providing the latter means with an additional byte input. Also, the said multiplexing means are provided with inputs connected to read-out outputs of the stores and with inputs connected to external data inputs to be combined with such store outputting data.

BRIEF DESCRIPTION OF THE DRAWINGS:

These and further features will be explained in full detail with reference to an illustrative embodiment, from which may be derived any structure within the scope of the invention, shown in the accompanying drawings, wherein.

Figure 1:
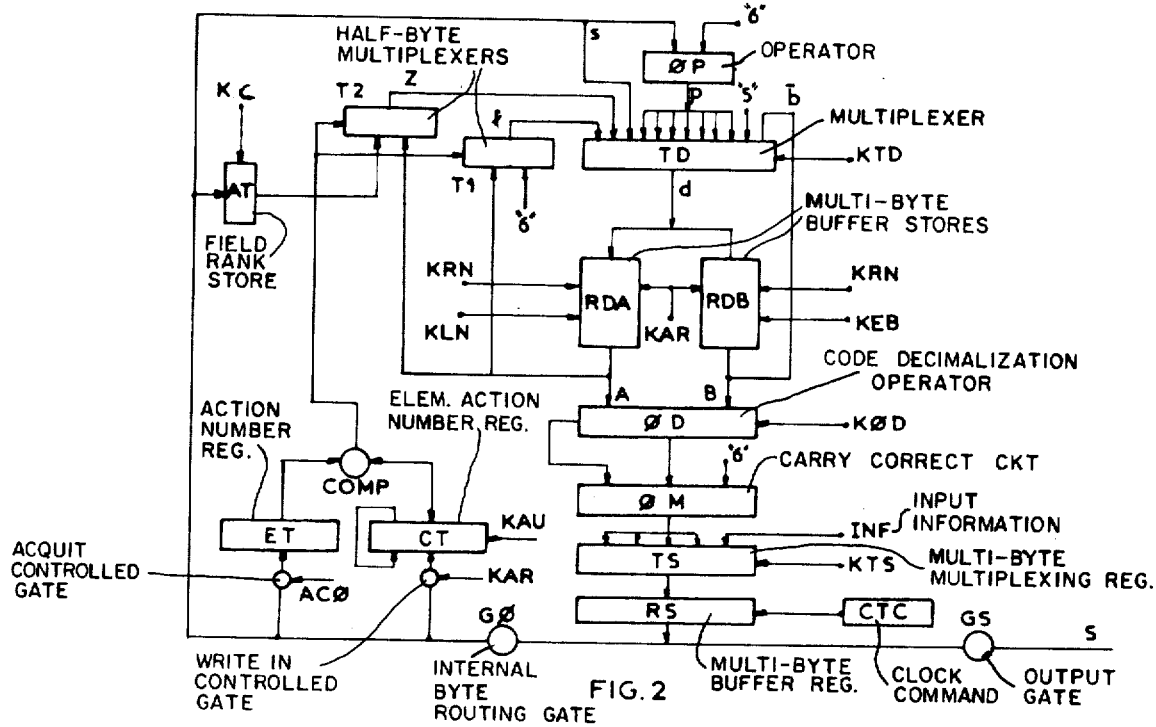
FIG. 1 is a block diagram of the device together with the command words format for controlling said device.

DETAILED DESCRIPTION:

Any byte constituting a member of a string of bytes is considered as being an octet byte. Each byte consequently represents or may represent two binary-coded decimal figures. Each incoming byte is applied to the input INF of a multiplexer circuit TS through which it is buffered within a register RS. The multiplexer circuit TS is controlled from the control code KTS of any microinstruction or command word shown in the upper part of FIG. 1. In this format word representation, any bit location which is not significant for the byte operator device is marked with the symbol (x). The first and third lines of this format representation define the word data fields whereas the second line gives more explicit representation of certain data fields of the word.

The multiplexer circuit TS is further provided with inputs connected to outputs of a logical and arithmetical operator $\phi D$ through a circuit $\phi M$ intended to correct the codes issuing from $\phi D$ when, in such arithmetical operations as additions and subtractions, carries are met from quartet to quartet of an octet byte resulting from the operation of $\phi D$. Actually, $\phi M$ may be considered as included in $\phi D$, or stated otherwise, the operator comprises both $\phi D$ and $\phi M$. The nature of the operation in $\phi D$ is controlled from the data in the field $K\phi D$ of the microinstruction of data command words in the format of FIG. 1. Illustratively, $\phi D$ may execute the following operations on the byte codes inputting at A and B:— add B to A, subtract B from A, intersect A and B, derive from A + B the logical (OR) code, derive from A and B the exclusive (OR) code, transfer A, transfer B, add or subtract decimal figure 1 to either A or B, or deliver either an all-one's or an all zeroe's code, and so forth.

It is an advantage to provide the register RS with a multibyte capacity and, in such case, the register RS will be read under the control of a local clock CTC, which may for instance be a pulse counter counting pulses from a general clock of the equipment wherein the operator is connected, the pulse counter being of the ring connected type. Each pulse from CTC shifts the bytes by one unit and consequently issues the bytes one by one either to an output S through a clocked gate GS or to the input of the byte operator through a clocked gate G$\phi$. The bytes passing through G$\phi$ are applied to both an input s and an input of a circuit $\phi P$ of the operator device. The input s is one of the inputs of a multiplexer circuit TD and the output of $\phi P$ is connected to a defined plurality of inputs of TD.

Instead of a single register RS, two separate registers may be provided, one at the output of the TS multiplexing circuit and the other one at terminal INF, through a further multiplexing circuit. In such a case, RS would only be of a one-byte capacity. Further, the output of the clock CTC would be routed to the read-out control input of RS or of the other register under the control of KTS.

Figure 2:
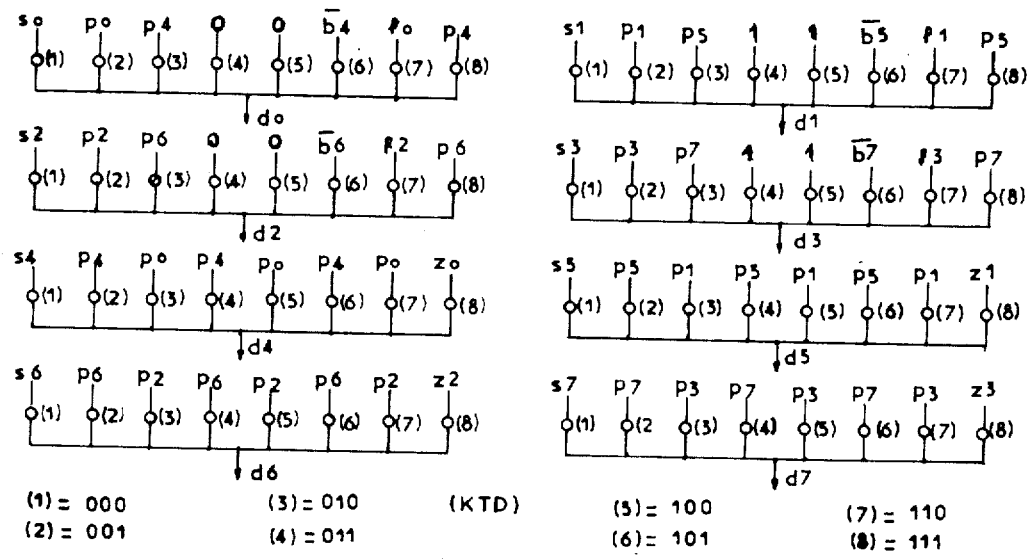
FIG. 2 is an illustrative representation of the multiplexer structure shown at TD in FIG. 1; and, FIG. 3 shows a more detailed view of the core port of FIG. 1.

The output $d$ of the multiplexer operator circuit TD is connected to write-in inputs of two multi-byte stores RDA and RDB. The write-in addresses AE and the write-in controls CE are supplied from the fields KRN and KAR of the command microinstruction word. The write-in controls cannot be concomitant. On the other hand, in most operations, the read-out of the two stores will be simultaneous so that the logical and arithmetical operator $\phi D$ will process the pair of read-out words. A read-out from RDA might be simultaneous with a read-in of either one of the stores but, most often, a read-out from RDB will not be simultaneous with a write-in in either RDA or RDB. It is further provided that the byte word capacity of RDB is much higher than the byte word capacity of RDA so that RDB may buffer a complete sequence of bytes in a string applied to INF. Stated otherwise, RDA is intended to act as a task executive store in the byte operator device whereas RDB will act as an internal store for the device. Introduction of fresh data may be made to overlap with operative steps of the device. In both occurrences, the multiplexer operator TD is placed under the control of the part KTD of the field of the mircroinstruction or command word for handling the inputting codes to be written into the stores RDA and RDB. Illustratively — as the varied operations in TD are obviously a matter of choice,—the following operations may be provided as shown in FIG. 2 for the concerned example wherein a byte is an octet word subdivided into two quartet words each of which may be interpreted as a binary-coded decimal value of digits. It is further assumed that KTD is a three bit code, and that, consequently, a decoder of KTD will have eight outputs, from (1) to (8). The device TD will derive from inputting codes and digits, either bytes, from $do$ to $d7$ representing two quartets, $do$ to $d3$ and $d4$ to $d7$. The scale of weights of the digits are from $do$ to $d7$, in the decreasing direction, i.e., the quartet $do$ to $d3$ will be said to be the heavier weight quartet and the quartet from $d4$ to $d7$ will be said to be the lighter weight quartet. The word quartet summarizes the binary-coded decimal figure word.

In FIG. 2, the multiplexer circuit TD comprises eight multiplexing members, each having eight AND-gates the outputs of which are OR-united to a single output $d$. The AND-gates are for the sake of simplicity identified in these eight members by the ranks of their corresponding commands (1) to (8) decoded from the three bit KTD code.

When (1) is activated, TD transfers its $do$ to $d7$ outputs the seven bits $so$ to $s7$.

When (2) is activated, TD transfers to its $do$ to $d7$ outputs, the seven bits $po$ to $p7$ issuing from the code converter $\phi P$ which receives the seven bits $so$ to $s7$ and adds the binary coded decimal value 6 to the quartets. This addition will be taken into account in the output operator $\phi M$ of the arithmetical and logical operator $\phi D$. Further, when required, the circuit $\phi P$ may be used as a code detector for detecting errors in the encoding of the quartets. If an error occurred, a carry will be obtained and can be detected.

When (3) is activated, TD transfers the inputting quartets $po$ to $p3$ and $p4$ to $p7$ with a permutation of said quartets. The outputs $do$ to $d3$ receive $p4$ to $p7$ and the outputs $d4$ to $d7$ receive $pO$ to $p3$.

When (4) is activated, TD transfers a code representing the decimal value 5 to its outputs $do$ to $d3$ and transfers the quartet $p4$ to $p7$ to its $d4$ to $d7$ outputs. When (5) is activated, TD still transfers the 5 decimal value code to its outputs $do$ to $d3$ and transfers the quartet $po$ to $p3$ to its $d4$ to $d7$ outputs.

When (6) is activated, TD serially connects a quartet read-out from the RDB store, in bit complementary representation, $\overline{b4}$ to $\overline{b7}$ to its $do$ to $d3$ outputs and the quartet $p4$ to $p7$ to its $d4$ to $d7$ outputs.

When (7) is activated, TD serially connects a quartet $fo$ to $f3$ to its $do$ to $d3$ outputs with a quartet $po$ to $p3$ to its $d4$ to $d7$ outputs.

When (8) is activated, TD transfers the quartet $p4$ to $p7$ to its outputs $do$ to $d3$ and a quartet $zo$ to $z3$ to its outputs $d4$ to $d7$.

As said, the store RDA may be read-out even if a byte is being written into it. Any quartet $a4$ to $a7$ read out from RDA is applied to an elementary multiplexer circuit T2 and to another elementary multiplexer circuit T1. The other input of T2 is a four bit code which is stored in a quartet store AT. The other input of T1 is a four bit code representing the decimal value 6. T1 when activated delivers the quartet code $fo$ to $f3$. T2 when activated delivers the quartet code $zo$ to $z3$.

The register AT is loaded with a code defined by the macroinstruction which initiates the execution of the microprogram and consequently is loaded with the code at the beginning of the microprogram. Such a loading operation is made only when the first microinstruction of the microprogram contains 1 in the KC field of the microinstruction format, see FIG. 1. The code loaded into AT points to a rank of the field to which an address exists in the instruction. In the example of FIG. 1, the code for AT passes through the register RS and the gate $G\phi$. Of course, the register AT can be loaded through another connecting link.

The structures of the multiplexers T1 and T2 are obvious with respect to the description of TD. Each one of T1 and T2 is comprised of four multiplexing members each comprising two AND-gates having a common output and separate inputs, plus a complementary controlled input, so that for 0 one gate is conducting and the other one is blocked, and vice-versa for 1.

The circuit which controls the multiplexer T1 and T2 is a comparator circuit COMP which compares the contents from two registers EC and CT. These registers are loaded by the program; for instance, their inputs are connected to the output of the gate $G\phi$ through respective and-gates ACQ and KAR. EC receives a data defined in the field KAU of the microinstruction word through the gate controlled by the acquit signal ACQ of the execution of the preceeding micro-instruction. CT receives through a gate which is unblocked from decoding of the KAR part of the microinstruction which begins the microprogram, a code defining the number of elementary actions to be executed for the task defined by the microprogram. The code may be from the field KAU of the format word of the said first microinstruction. Thereafter, each executed micro-instruction decceases by one unit the content of CT. As long as the contents of CT and EC do not coincide, the multiplexer circuits T1 and T2 apply to TD the quartets read from RDA. When the contents of CT reaches the value of the content of EC, the multiplexer T1 applies 6 to TD and the multiplexer circuit T2 applies to TD the quartet stored within AT.

FIG. 3 shows a part of FIG. 1 in a more detailed fashion and when the bytes are octets. The circuits marked I in FIG. 3 are inverters. The $\phi P$ operator consists of two separate adders $\phi P1$ and $\phi P2$. The arithmetical and logical operator $\phi D$ operates on codes from RDA and RDB which are always relatively expressed in reverse representations. (See the inverter in the connection from RDA to $\phi D$.) $\phi D$ comprises two quartet operator circuits $\phi D1$ and $\phi D2$ and a connection $R\phi D$ ensures the transfer of the carries from $\phi D1$ to $\phi D2$. When an operation necessitates two successive steps in $\phi D$, the carry from the first step to the second one is stored at M$\phi$ from $\phi D2$. The content of M$\phi$ will be transferred to the carry input of $\phi D1$ through a gate unblocked by the command K$\phi D$ controlling said second step. As in conventional decimal parallel numeration adder-subtractors, a circuit $\phi M$ is provided for effecting corrections at the output of the operator proper. The $\phi M$ circuit is divided into two elementary circuits $\phi M1$ and $\phi M2$. Further, as $\phi P$ presents the codes to $\phi D$ with the 6 addition and because the carries to $\phi M1$ and $\phi M2$ are transferred through inverters, the $\phi M$ circuit operates as follows:— when a carry is send from $\phi D1$ or from $\phi D2$, the quartet from $\phi D1$ or $\phi D2$ is solely transferred to TS; — in the contrary occurrence, i.e. no carry, the decimal value 6 is added to the decimal code from $\phi D1$ by $\phi M1$ and/or from $\phi D2$ by $\phi M2$ (which is equivalent to subtracting 6 if the operation were made in normal polarity.

The outputs of $\phi M$ are applied to inputs of TS wherein they may be the subject of appropriate shifts for their buffering in RS. As the codes issue in reverse polarity from G$\phi$, an inverter I is inserted between G$\phi$ and the inputs of $\phi P$. Neither $\phi P$ nor TD are considered as reversing polarity circuits.

What is claimed is:

1. A microprogram controlled byte operator device for processing strings of bytes wherein each byte has the same number of binary bit quartets comprising in combination:

a byte arithmetical and logical operator circuit having first and second byte inputs and a byte output;

a multi-byte register means connected to the output of said operator circuit;

first and second addressable byte stores, each capable of storing a plurality of bytes and having a byte write-in input and a byte readout output, the byte readout outputs of said first and second stores being respectively connected to said first and second byte inputs of said arithmetical and logical operator circuit; input means adapted to sequentially receive the bytes of the strings of bytes;

a plural input multiplexer circuit having a plurality of byte inputs and a plurality of quartet inputs and having an output connected to the byte write-in inputs of said first and second addressable byte stores, one of said byte inputs being connected to a byte output of said multi-byte register means and of said input means.

2. A byte operator device according to claim 1 wherein said input means comprises register means.

3. A byte operator device according to claim 1 wherein a first gate is connected between the output of said multi-byte register means and a byte input of the plural input multiplexer circuit and a second gate connects said multi-byte register means and an output lead from said operator device.

4. A byte operator device according to claim 1, wherein said first and second addressable byte stores each has a quartet read-out connected to a quartet input of said plural input multiplexer circuit.

5. A byte operator device according to claim 1 including a byte decimalization circuit having a byte input connected to the output of said input means and bit outputs connected to a plurality of byte and quartet inputs of said plural input multiplexer circuit.

6. A byte operator device according to claim 5, wherein said byte decimalization circuit comprises first and second modulo-2 adder circuits, each adding a digital code 6 to each quartet of a byte and wherein said byte arithmetical and logical operator circuit includes a digital code 6 subtracting circuit.

7. A byte operator device according to claim 1, wherein two-input multiplexer circuits, each having an input to a quartet readout output of said addressable byte stores and each having its other input connected to a parameter code source and each having a control input, have their outputs respectively connected to the said quartet inputs of the said plural input multiplexer circuit.

8. A byte operator device according to claim 7 wherein one of said parameter code sources comprises a register storing a code representing a rank of field of a microprogram.

9. A byte operator device according to claim 7, comprising, in combination:

a first code register loaded with a microprogram code defining a number of elementary steps to be executed by the byte operator circuit;

a second code register loaded with a microinstruction code defining the rank of the step defined by each microinstruction in the microprogram; means decrementing by one unit on the execution of each elementary step of the microprogram, the code of the first code register;

a code comparator, having first and second inputs connected to outputs of said first and second code registers and having an output connected to the control inputs of the said two-input multiplexor circuits.

10. A byte operator according to claim 9 wherein input gates connect the said first and second code registers to input register means.

* * * * *